United States Patent
Harris et al.

(10) Patent No.: US 9,723,097 B2
(45) Date of Patent: *Aug. 1, 2017

(54) ASSIGNING SHARED CATALOGS TO CACHE STRUCTURES IN A CLUSTER COMPUTING SYSTEM

(71) Applicant: International Business Machines Corporation, Armonk, NY (US)

(72) Inventors: Eric J. Harris, Vail, AZ (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/747,117

(22) Filed: Jun. 23, 2015

(65) Prior Publication Data

US 2015/0288778 A1    Oct. 8, 2015

Related U.S. Application Data

(63) Continuation of application No. 13/732,996, filed on Jan. 2, 2013, now Pat. No. 9,092,430.

(51) Int. Cl.
*G06F 7/00* (2006.01)
*G06F 17/30* (2006.01)
(Continued)

(52) U.S. Cl.
CPC ............ *H04L 67/2842* (2013.01); *G06F 9/00* (2013.01); *G06F 17/30* (2013.01);
(Continued)

(58) Field of Classification Search
CPC ............ H04L 67/2842; H04L 41/0893; H04L 65/4015; G06F 9/00
(Continued)

(56) References Cited

U.S. PATENT DOCUMENTS 4,408,273 A   10/1983   Plow
5,692,174 A   11/1997   Bireley et al.
(Continued)

OTHER PUBLICATIONS

Tate et al., "Enhanced Catalog Sharing and Management", Jul. 1999, Published by IBM, pp. 1-148, http://www.redbooks.ibm.com/redbooks/pdfs/sg245594.pdf.

*Primary Examiner* — Md. I Uddin
(74) *Attorney, Agent, or Firm* — Kunzler Law Group

(57) ABSTRACT

An apparatus, system, and method for assigning a cache structure to a catalog. The apparatus includes an identification module configured to identify a catalog for sharing in association with a coupling facility. The coupling facility includes a plurality of cache structures for catalogs of a cluster computing system. The coupling facility is configured to facilitate data sharing among a plurality of host systems of the cluster computing system. The apparatus includes a selection module configured to select a cache structure of the plurality of cache structures for the catalog based on one or more usage status indicators according to an assignment policy. The apparatus includes a storage module configured to store catalog information of the catalog in the cache structure in response to the selection module selecting the cache structure.

13 Claims, 7 Drawing Sheets

(51) Int. Cl.
  *H04L 29/08* (2006.01)
  *H04L 12/24* (2006.01)
  *H04L 29/06* (2006.01)
  *G06F 9/00* (2006.01)

(52) U.S. Cl.
  CPC ...... *H04L 41/0893* (2013.01); *H04L 65/4015* (2013.01); *H04L 67/10* (2013.01)

(58) Field of Classification Search
  USPC .............................. 707/610, 687, 740, 803
  See application file for complete search history.

(56) References Cited

U.S. PATENT DOCUMENTS

| | | |
|---|---|---|
| 8,423,505 B2 | 4/2013 | Chauvet et al. |
| 2002/0023070 A1 | 2/2002 | Branch et al. |
| 2008/0140937 A1 | 6/2008 | Nalawade et al. |
| 2009/0144388 A1 | 6/2009 | Gross et al. |
| 2010/0185697 A1* | 7/2010 | Lehr ................. G06F 17/30312 |
| | | 707/803 |
| 2011/0173154 A1 | 7/2011 | Chauvet et al. |
| 2013/0275670 A1 | 10/2013 | Harris et al. |

* cited by examiner

ASSIGNING SHARED CATALOGS TO CACHE STRUCTURES IN A CLUSTER COMPUTING SYSTEM

CROSS-REFERENCE TO RELATED APPLICATIONS

This is a continuation application and claims priority to U.S. patent application Ser. No. 13/732,996 entitled "ASSIGNING SHARED CATALOGS TO CACHE STRUCTURES IN A CLUSTER COMPUTING SYSTEM" and filed on Jan. 2, 2013 for Eric J. Harris, which is incorporated herein by reference.

FIELD

The subject matter disclosed herein relates to shared catalogs and more particularly relates to assigning shared catalogs to cache structures.

BACKGROUND

Description of the Related Art

Cluster computing systems, such as IBM® Corporation's Parallel Sysplex, allow for parallel computing, data recovery, and the like. A typical cluster includes multiple host systems linked together to enable data and workload sharing, acting as a single system. In a Sysplex, a Coupling Facility is typically used to coordinate and manage data sharing and access.

Often these cluster computing systems use catalogs that include information, such as location information, about the data sets residing on storage of the system. These catalogs are typically shared among host systems of the cluster. Using Enhanced Catalog Sharing (ECS), the coupling facility may store update information for catalogs, allowing host systems to access the update information from the coupling facility instead of from storage.

BRIEF SUMMARY

An apparatus is presented. In one embodiment, the apparatus includes an identification module configured to identify a catalog for sharing in association with a coupling facility. The coupling facility may include a plurality of cache structures for catalogs of a cluster computing system. The coupling facility may be configured to facilitate data sharing among a plurality of host systems of the cluster computing system. In one embodiment, the apparatus includes a selection module configured to select a cache structure of the plurality of cache structures for the catalog based on one or more usage status indicators according to an assignment policy. In one embodiment, the apparatus includes a storage module configured to store catalog information of the catalog in the cache structure in response to the selection module selecting the cache structure.

A method for assigning a cache structure to a catalog is presented. In one embodiment, the method includes identifying a catalog for sharing in association with a coupling facility. The coupling facility may include a plurality of cache structures for catalogs of a cluster computing system. The coupling facility may be configured to facilitate data sharing among a plurality of host systems of the cluster computing system. In one embodiment, the method includes assigning the catalog to a cache structure of the plurality of cache structures based on one or more usage status indicators according to an assignment policy. In one embodiment, the method includes storing catalog information of the catalog in the cache structure in response to selecting the cache structure.

A computer program product comprising a computer readable storage medium storing machine readable code executed by a processor to perform operations for assigning a cache structure to a catalog is presented. In one embodiment, the operations include identifying a catalog for sharing in association with a coupling facility according to Enhanced Catalog Sharing (ECS). The coupling facility may include a plurality of cache structures for catalogs of a cluster computing system. The coupling facility may be configured to facilitate data sharing among a plurality of host systems of the cluster computing system. In one embodiment, the operations include assigning the catalog to a cache structure of the plurality of cache structures based on one or more of an availability indicator and catalog usage according to an assignment policy stored in a coupling facility resource management (CFRM) data set of the cluster computing system. In one embodiment, the operations include storing a Virtual Storage Access Method (VSAM) volume record (VVR) corresponding to the catalog in the cache structure in response to selecting the cache structure. The VVR may include update information.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
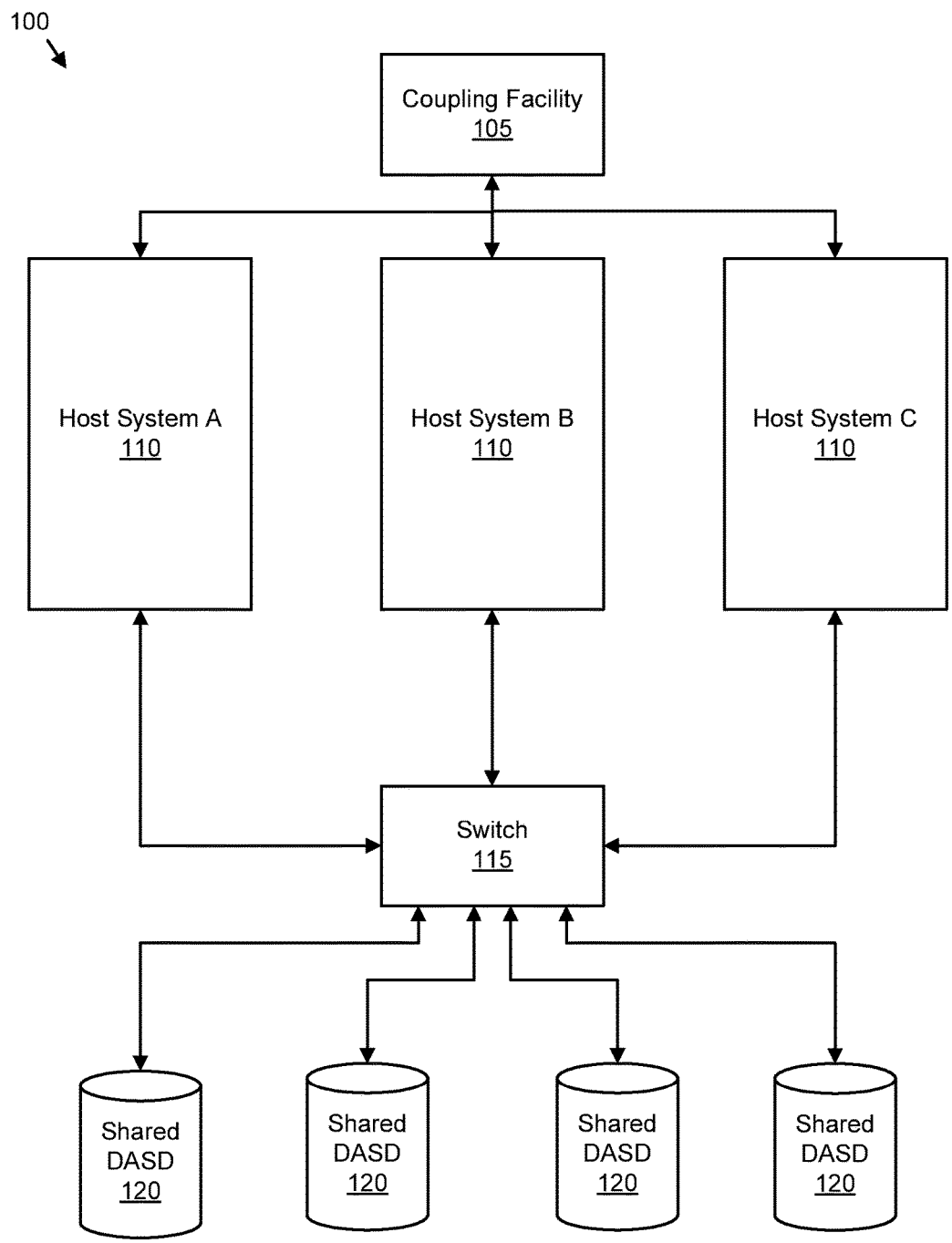
FIG. 1 is a schematic block diagram illustrating one embodiment of a system for assigning shared catalogs to cache structures in accordance with the present subject matter.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or N flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for assigning shared catalogs to cache structures in accordance with the present subject matter. Specifically, FIG. 1 depicts a cluster computing system 100. In one embodiment, the cluster computing system 100 is a Parallel Sysplex, such as the S/390, from International Business Machines Corporation, Armonk, N.Y., or other suitable cluster computing system. The system 100 includes a plurality of host systems 110. Each host system 110 may include one or more processors, memory, and the like. The processors 105 execute the computer readable programs as known to those skilled in the art. Each host system 110 may be embodied as a mainframe computer. In one embodiment, each host system 110 includes a Z/OS® operating system by International Business Machines Corporation of Armonk, N.Y. Each host system 110 may provide one or more Logical Partitions (LPARs). Specifically, an LPAR is a type of virtual machine comprising a virtualization of the host system's 110 resources. A host system 110 may be partitioned into multiple LPARs and each LPAR may host a separate instance of the operating system. Although three host systems 110 are depicted, the cluster computing system 100 may include any suitable number of host systems 110. The memory stores computer readable programs.

The plurality of host systems 110 communicate with a plurality of direct access storage device (DASDs) 120 shared among the host systems 110. The DASDs 120 may comprise secondary storage devices, disk arrays, and the like. The host systems 110 read data from the DASDs 120. Specifically, the DASDs 120 may store data sets for access by the host systems 110. Although four DASDs 120 are depicted, the system may include any suitable number of DASDs 120.

The host systems 110 may access data from the DASDs 120 according to a virtual storage access method (VSAM). The host systems 110 may connect to the DASDs 120 through a switch 115, such as a fibre connection (FICON) switch. Furthermore, an external time source (not depicted) or Server Time Protocol (STP) implemented by the host systems 110 may be used to synchronize the clocks of the host systems 110.

Catalogs may be used to facilitate locating data sets and to categorize data in the cluster computing system 100. A catalog is itself a data set that includes information about other data sets. Each VSAM data set is cataloged. Catalogs may be master catalogs or user catalogs. Each host system 110 has a master catalog with entries for system data sets. User catalogs include entries for application specific data sets.

Catalogs may be shared among host systems 110 and an integrated catalog facility (ICF) structure may be used by the system for catalog sharing. Catalogs may have two parts: the basic catalog structure (BCS) and the VSAM volume data set (VVDS). The VVDS may include catalog update information so that host systems 110 may detect changes made to catalogs. This catalog update information may be referred to as a volume record generally and a VSAM volume record (VVR) or integrity VVR specifically. A host system 110 that modifies the catalog may store a record of the change (e.g. a timestamp and counter update) and may check the VVR to ensure that it has the latest version of data stored in cache. Instead of reading the VVR stored on disk, catalogs may be shared according to Enhanced Catalog Sharing (ECS), which involves storing the VVR on a coupling facility 105 to reduce I/O to a catalog data set on disk as described below.

The host systems 110 communicate with a coupling facility 105. The coupling facility 105 coordinates data access and synchronization by the host systems 110. The coupling facility 105 may be separately embodied from the host systems 110 as depicted. For example, the coupling facility 105 may be embodied as a separate mainframe unit. In certain embodiments, the coupling facility 105 may execute in an LPAR.

The coupling facility 105 may execute in an LPAR on a mainframe external from the host systems 110. In one embodiment, the coupling facility 105 executes in an LPAR on a host system 110. The LPAR may be specialized to execute coupling facility code. The coupling facility 105 may communicate with host systems 110 (e.g. LPARs on host systems 110) through coupling facility channels. In certain embodiments, one or more of the host systems 110 include a console (not depicted) in communication with the host system 110. The console may be a computing device that allows a user to enter commands, such as through a keyboard and mouse, and to view output, such as through a display device.

The coupling facility 105 includes a processor, memory, and a specialized operating system referred to as Coupling Facility Control Code (CFCC). The coupling facility 105 may provide locking and caching for shared data among the host systems 110. Although a single coupling facility 105 is depicted, in certain embodiments, the system 100 may include multiple coupling facilities.

The coupling facility 105 may be configured by a coupling facility resource management (CFRM), a specialized data set which specifies behavior and other specifications of the coupling facility 105. In addition, the coupling facility 105 may provide dedicated portions of memory called structures for reference by the host systems 110. A cache structure is one such structure.

The coupling facility 105 may provide cache structures for ECS catalog sharing (hereinafter "ECS cache structures"). As described above, catalogs may be shared according to ECS to reduce I/O to a catalog data set on disk as described below. As part of ECS, the coupling facility 105 stores volume records in the ECS cache structure. As a result, host systems 110 may be notified by the coupling facility 105 when changes to catalogs have occurred and may update the volume record in the coupling facility 105 without having to access the DASDs 120. Host systems 110 typically disconnect from a catalog if it requires maintenance or if the catalog is a master catalog for a host system 110 that will undergo maintenance. In cluster computing systems with a single cache structure, the host systems 110 disconnect each host system 110 from the cache structure and hence, from the volume records for all catalogs in ECS even if only a subset of the catalogs are affected. During the disconnect, the host systems 110 typically fall back to referencing the volume record from the DASDs 120.

In one embodiment, the coupling facility 105 provides a plurality of ECS cache structures. Each ECS cache structure may store one or more volume records. In one embodiment, the host systems 110 may disconnect from only the cache structures with the affected catalogs. For example, if a volume record for a first catalog is stored in a first ECS cache structure and a volume record for a second catalog is stored in a second ECS cache structure and the first catalog is scheduled for maintenance, the host systems 110 may disconnect from the first ECS cache structure while maintaining a connection to the second ECS cache structure.

Figure 2:
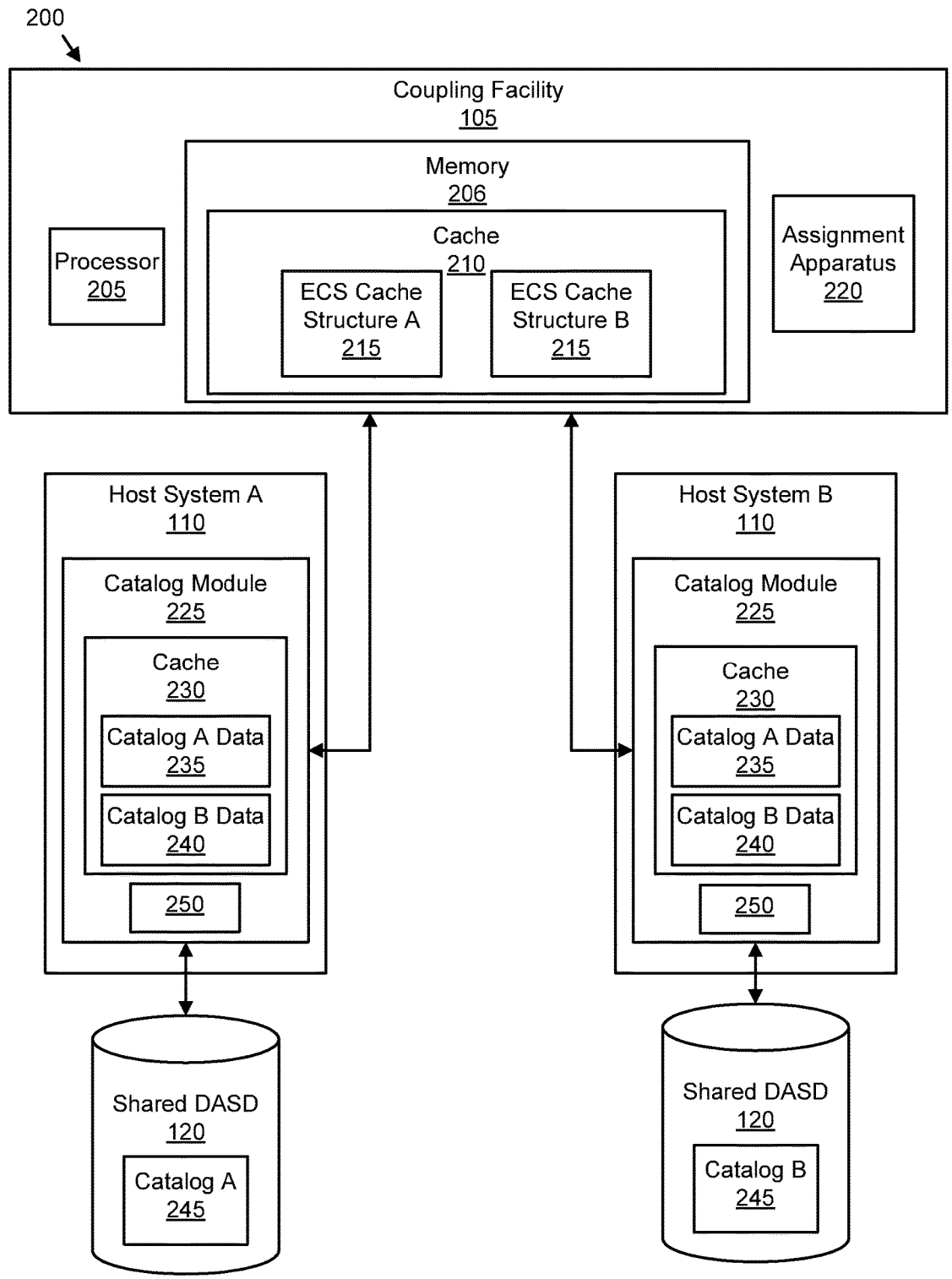
FIG. 2 is a schematic block diagram illustrating another embodiment of a system for assigning shared catalogs to cache structures in accordance with the present subject matter.

FIG. 2 is a schematic block diagram illustrating another embodiment of a system 200 for assigning shared catalogs to cache structures in accordance with the present subject matter. The system 200 includes the coupling facility 105 of FIG. 1 and exemplary host systems 110 and shared DASDs 120 similar to the like-named components of FIG. 1. In the depicted embodiment, the shared DASDs 120 store catalogs 245. Specifically, a first DASD 120 stores Catalog A 245 and a second DASD 120 stores Catalog B 245.

Each host system 110 includes a catalog module 225. In one embodiment, the catalog module 225 includes code, logic and functions to access catalogs 245 from the DASDs 120, read catalog data 235, 240 (e.g. catalog records) into cache, write catalog data 235, 240 to the DASDs 120, and the like. In one embodiment, the catalog module 225 includes the functionality of Catalog Address Space (CAS) which is devoted to catalog processing. The catalog module 225 may maintain a local map mapping catalogs 245 to their corresponding ECS cache structures 215 in the coupling facility 105. A host system 110 may synchronize its local map with a global map on the coupling facility 105 that has a master mapping of catalogs to ECS cache structures.

The catalog module 225, in one embodiment, is a persistent process that is started at host system 110 startup and that interacts with the coupling facility 105 for ECS. The ECS functions of a host system 110 may connect with the ECS cache structures 215 to access volume records for the catalogs 245 of the system 200. The catalog module 225 may execute as part of an operating system of the host system 110. Furthermore, the operating system may execute within an LPAR.

The coupling facility 105 includes a processor 205 and a memory 206. The memory 206 includes a cache 210 with a plurality of ECS cache structures 215. While FIG. 2 depicts two ECS cache structures 215, the cache 210 may include any suitable number of ECS cache structures 215 as described below. The ECS cache structures 215 may store volume records for the catalogs 245 accessed by the host systems 110. In one embodiment, when the catalog module 225 opens an ECS eligible catalog 245, the volume record is copied into the coupling facility 105 (e.g. to an ECS cache structure 215). Furthermore, a global ECS map may be stored by the coupling facility 105 to map each catalog 245 to an ECS cache structure 245.

The existence of multiple ECS cache structures 215 allows for variation in storing volume records. Consequently, the system 200 includes an assignment apparatus 220. The assignment apparatus 220 manages the assignment of catalog volume records to ECS cache structures 215. Specifically, in certain embodiments, the assignment apparatus 220 assigns ECS cache structures 215 to volume records based on usage status indicators such as catalog usage statistics, availability schedules (e.g. when the catalog 245 or host system 110 for a catalog 245 will be offline), error rates of a particular catalog 245, and the like. The assignment apparatus 220 may assign volume records to cache structures 215 based on an assignment policy having specifications, rules, and/or thresholds that specify when to move a volume record, where to assign a volume record, and the like. The movement of catalogs 245 between ECS cache structures 215 may be done dynamically as performance and statistical data changes, modifying cache structure assignments accordingly.

Although FIG. 2 depicts the assignment apparatus 220 as executing in the coupling facility 105, all or a portion of the assignment apparatus 220 may execute in one or more host systems 110, one or more host systems 110 and the coupling facility 105, or the like. For example, the assignment apparatus 220 may be part of the catalog module 225, the ECS functions, or the like, of one or more of the host systems 110. In one embodiment, all or a portion of the assignment apparatus 220 is a scheduled batch process than executes on a periodic basis.

Figure 3A:
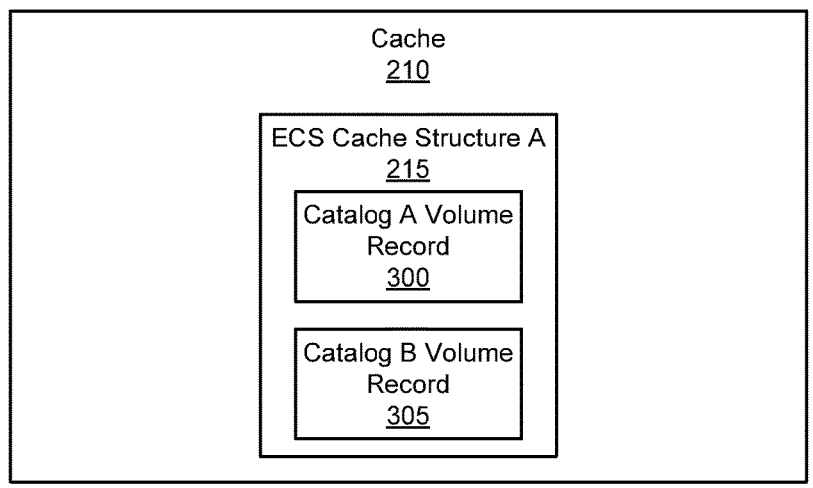
FIG. 3A is a schematic block diagram illustrating one embodiment of a coupling facility cache in accordance with the present subject matter.
Figure 3B:
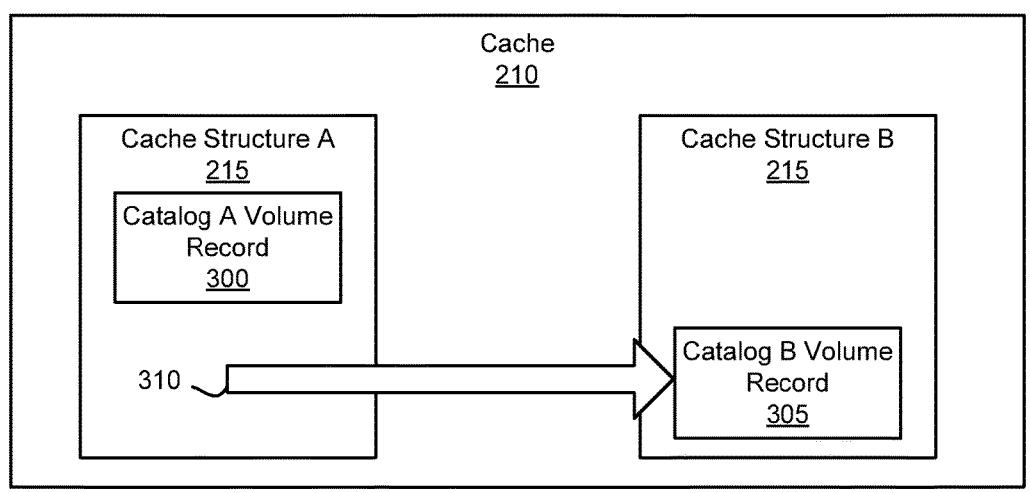
FIG. 3B is a schematic block diagram illustrating one embodiment of isolating a catalog volume record in accordance with the present subject matter.

FIG. 3A is a schematic block diagram illustrating one embodiment of a coupling facility cache 210 in accordance with the present subject matter. The coupling facility cache 210 may be the cache 210 of FIG. 2. Specifically, the coupling facility cache 210 includes an ECS cache structure 215 with a volume record 300 (e.g. a VVR) for Catalog A 245 and a volume record 305 for Catalog B 245. As depicted in FIG. 3B, the assignment apparatus 220 may move a volume record from one ECS cache structure 215 to another. In the depicted embodiment, the volume record 305 for Catalog B 245 is moved 310 to cache structure B 215. In certain embodiments, Catalog B volume record 305 may be isolated in cache structure B 215 such that no other volume records 305 are assigned and residing in cache structure B 215. The assignment apparatus 220 may isolate a particular volume record 305 for a particular catalog 245 in response to one or more of determining that the particular catalog 245 is damaged (e.g. by detecting an amount of errors that meet a threshold), determining that a host system 110 corresponding to the particular catalog 245 will be unavailable, and determining that the particular catalog 245 will be unavailable such as, for example, being scheduled for maintenance.

Figure 4A:
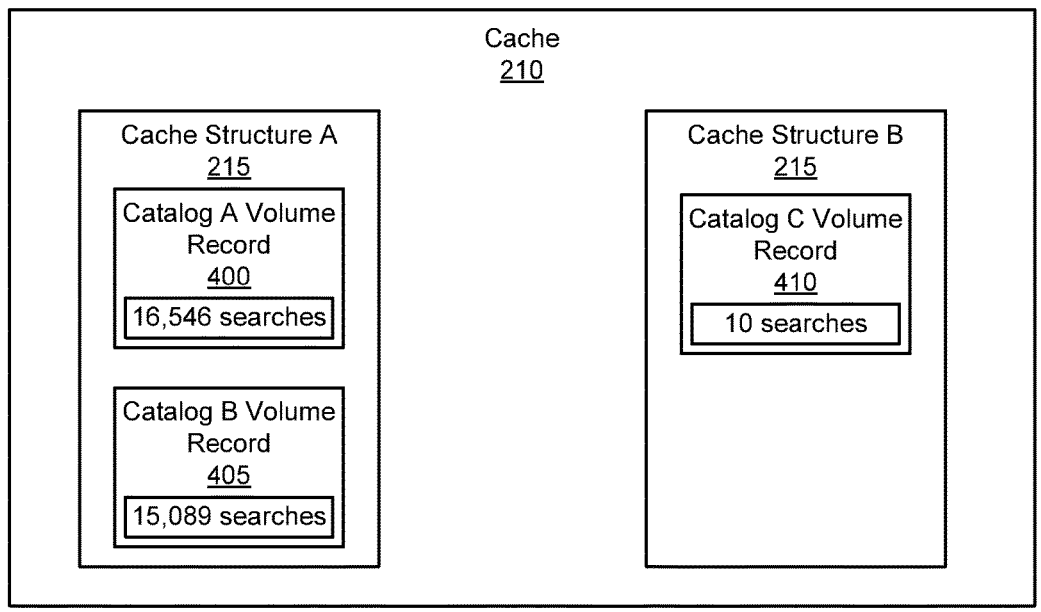
FIG. 4A is a schematic block diagram illustrating another embodiment of a coupling facility cache in accordance with the present subject matter.
Figure 4B:
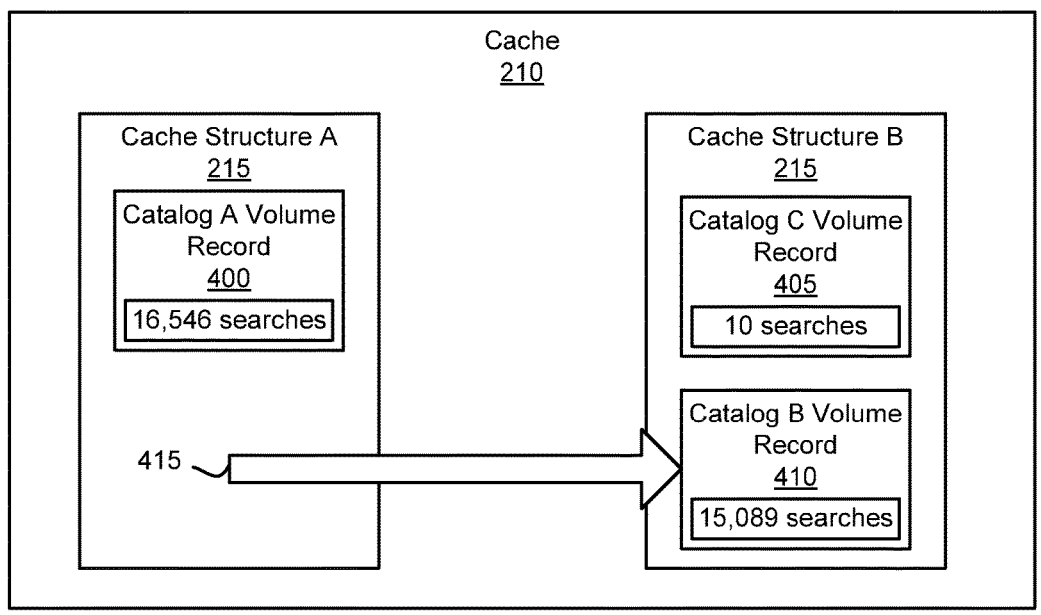
FIG. 4B is a schematic block diagram illustrating one embodiment of moving a catalog volume record in accordance with the present subject matter.

FIG. 4A is a schematic block diagram illustrating another embodiment of a coupling facility cache 210 in accordance with the present subject matter. FIG. 4A includes on embodiment of the cache 210 of FIG. 2. The cache 210 includes cache structure A 215 and cache structure B 215. Cache structure A 215 includes a volume record 400 for Catalog A 245 and a volume record 405 for Catalog B 245. Furthermore, cache structure B 215 includes a volume record 410 for Catalog C. As depicted, the assignment apparatus 220 may retrieve catalog usage statistics on catalogs 245 with corresponding volume records in cache. The catalog usage statistics may include a number of searches performed on these catalogs 245 indicating a level of access. In the depicted embodiment, Catalog A has had 16,546 searches, catalog B has had 15,089 searches, and Catalog C has had 10 searches.

As depicted in Figure B, the assignment apparatus 220 may move 415 Catalog B 245 into cache structure B 215 so as to more thoroughly balance I/O to the cache structures 215, as the number of searches on Catalog C 245 is not substantial. As a result, each cache structure 215 may receive a more equal amount of I/O in the future.

Figure 5:
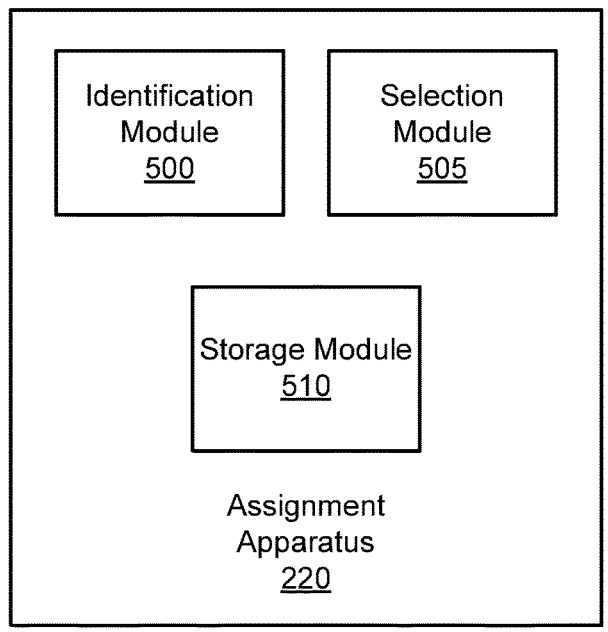
FIG. 5 is a schematic block diagram illustrating one embodiment of an assignment apparatus.

FIG. 5 is a schematic block diagram illustrating one embodiment of an assignment apparatus 220. The assignment apparatus 220 may be one embodiment of the assignment apparatus 220 of FIG. 2. The assignment apparatus 220 includes an identification module 500, a selection module 505, and a storage module 510.

The identification module 500, in one embodiment, identifies a catalog 245 for assignment evaluation. The catalog 245 may be for sharing in association with a coupling facility 105. In a further embodiment, the catalog 245 is for ECS sharing as described above. In one embodiment, the identification module 500 may identify a catalog 245 for initial assignment into an ECS cache structure 215. In this embodiment, the identification module 500 may identify a catalog 245 for assignment evaluation in response to a catalog module 225 opening the catalog 245 where the volume record is prepared for copying into the coupling facility 105.

In one embodiment, the identification module 500 identifies a catalog 245 for assignment evaluation that is already active in the coupling facility 105 and already has its volume record stored in an ECS cache structure 215. For example, the identification module 500, as part of a scheduled batch process, may monitor various catalogs 245, iterate through catalogs 245 and evaluate each one for reassignment. Catalogs 245 identified by the identification module 500 may be user catalogs or master catalogs. In one embodiment, the identification module 500 identifies a particular catalog 245 in response to catalog usage of the particular catalog 245 meeting a threshold. For example, catalogs 245 used more heavily in comparison with other catalogs 245 may be isolated as described above.

The selection module 505, in one embodiment, selects a cache structure 215 of the plurality of cache structures 215 for the catalog 245 based on one or more usage status indicators according to an assignment policy. The selection module 505 may also assign a catalog 245 to a cache structure 215 based on these usage status indicators. In one embodiment, the usage status indicators include catalog usage statistics such as a number of searches for catalogs 245, performance data, and the like. The selection module 505 may select the cache structure 215 for the catalog 245 based at least in part on the catalog usage statistics. Usage status indicators may include historical usage (e.g. a total number of searches), usage patterns (e.g. an increased number of searches at certain time periods), estimated future usage (e.g. extrapolated usage based on historical usage), and the like.

In one embodiment, the usage status indicators include an availability schedule. The selection module 505 may select the cache structure 215 for the catalog 245 based at least in part on the availability schedule. The availability schedule may include one or more of scheduled availability and scheduled unavailability for a catalog 245. A catalog 245 may be unavailable when it is taken offline for maintenance such as a for a catalog reorganization. The availability schedule may also include one of scheduled availability and scheduled unavailability for a host system 110 corresponding to a particular catalog 245. For example, if the particular catalog 245 is the master catalog 245 of a host system 110 or otherwise specifically accessed by a host system, and that host system 110 is scheduled for maintenance and will be unavailable for a certain period of time, the availability schedule may indicate such unavailability.

The assignment policy may specify certain performance attributes, thresholds, and the like (generally or associated with particular ECS cache structures 215), which, if satisfied by referenced usage status indicators, may trigger an assignment to a particular ECS cache structure 215 or a move from one ECS cache structure 215 to another. For example, the assignment policy may specify that if a catalog 245 has a certain number of errors, the volume record for the catalog 245 is to be isolated in its own ECS cache structure 245. The assignment policy may specify that certain volume records should be moved to different cache structures 215 to balance I/O (e.g. a number of searches) among cache structures 215. The data in the assignment policy may be compared against catalog usage data residing in CAS statistics that is stored in CAS to determine which ECS cache structure 215 to select or whether a reassignment is needed. In one embodiment, the assignment policy is stored in the CFRM policy.

The selection module 505 may additionally select an ECS cache structure 215 for a catalog 245 based on one or more of current performance activity, historical catalog usage activity predicting future workloads, moving catalogs 245 with the highest usage requirements into the highest performing ECS cache structures 215, and changing the overall number of catalog cache structures 215 so that the optimal number exists at any given time. For example, in one embodiment, the historical catalog usage activity may indicate that a first catalog 245 sees an increase in activity in the morning while another catalog 245 sees an increase in activity in the afternoon. The selection module 505 may group the catalogs 245 together in a common ECS cache structure 215 due to the decreased likelihood that the catalogs 245 will be heavily used at the same time.

In one embodiment, the selection module 505 may isolate a catalog 245 by assigning a catalog 245 to its own ECS cache structure 215 such that no other catalogs 245 are assigned to the cache structure. Specifically, in one embodiment, the cache structure 215 selected by the selection module 505 is a temporary cache structure. The selection module 505 may move catalog information for the catalog 245 from a first cache structure 215 to the temporary cache structure 215 in response to one of scheduled unavailability for the catalog 245 and scheduled unavailability for a host system 110 accessing the catalog 245. The selection module 505 may move the catalog information from the temporary cache structure 215 to the first cache structure 215 subsequent to the one of scheduled unavailability for the catalog 245 and scheduled unavailability for a host system 110 accessing the catalog 245.

This temporary cache structure 215 may be a maintenance ECS cache structure 215 set aside for temporary storage of volume records for catalogs 245 undergoing maintenance or whose host systems 110 are undergoing maintenance, and the like. In a further embodiment, the selection module 505 isolates the catalog 245 in response to one of determining that the catalog 245 is damaged, determining that a host system 110 will be unavailable, and determining that the catalog 245 will be unavailable. For example, if a particular host system 110 is scheduled to be taken off-line (e.g. one or more of disconnected from the coupling facility 105 and from other host systems 110), shut down, or otherwise made unavailable, leaving a volume record in the host system's master catalog 245 in an ECS cache structure 215 with other volume records may produce negative performance issues or interfere with the other volume records. Therefore, the selection module 505 may isolate the volume record for that host system 110 in its own ECS cache structure 215. When the host system 110 is taken off-line, only the ECS cache structure 215 for that host system 110 may be disconnected from the host systems 110.

The maintenance ECS cache structures 215 may be specified in the assignment policy. The selection module 505 may automatically select catalogs 245 to be assigned to these maintenance ECS cache structures 215 when a particular catalog 245 is flagged as in need of maintenance. For example, during a catalog reorganization, a volume record of a catalog 245 may be set by the selection module 505 to be migrated to a maintenance ECS cache structure 215 automatically prior to the start of the reorganization with the target cache structure 215 being the structure identified in the assignment policy as the maintenance cache structure. After the reorganization finishes, the catalog 245 can be assigned back to its previous ECS cache structure 215 and its volume record copied back to its previous ECS cache structure 215.

As stated above, the assignment policy may specify that certain volume records should be moved to different cache structures 215 to balance I/O (e.g. a number of searches) among cache structures 215. Therefore, in one embodiment, the selection module 505 may assign high-use catalogs 245 (e.g. catalogs 245 with use above a threshold) to ECS cache structures 215 having no other catalogs 245 or catalogs 245 with lower use in relation to other catalogs 245. Specifically, in certain embodiments, usage of a particular catalog 245 may meet a high usage threshold meaning that the particular catalog 245 may have a number of searches meeting a threshold or meeting a certain threshold percentage of searches in comparison with other catalogs 245. The selection module 505 may select a cache structure 215 for the particular catalog 245 having one or more assigned catalogs 245 meeting a low usage threshold meaning that the assigned catalogs 245 may have a number of searches meeting a threshold or a certain percentage of searches meeting a certain threshold percentage of searches in comparison with other catalogs 245.

The selection module 505 may select a cache structure 215 for a catalog 245 for assignment and storage of the catalog's 245 volume record after the selection. The selection module 505 may also select a cache structure 215 for a catalog 245 for assignment and storage of the catalog's 245 volume record at a future point in time. For example, the selection module 505 may select a cache structure 215 and schedule a time (e.g. before the catalog 245 has maintenance performed) in which the catalog's 245 volume record will be copied to the cache structure.

In one embodiment, assigning a catalog 245 to a cache structure includes updating a global ECS map of the coupling facility to inform the host systems 110 of the assignment.

The storage module 510, in one embodiment, stores catalog information of the catalog 245 in the cache structure 215 in response to the selection module 505 selecting the cache structure and/or assigning the catalog 245 to a cache structure 215. As stated above, the catalog information may include update information for the catalog 245 and the update information may include a volume record (e.g. a VVR) for the catalog 245.

The storage module 510 may store a volume record for a catalog 245 upon the catalog 245 becoming active. The storage module 510 may also store a volume record for a catalog 245 previously assigned to a different ECS cache structure 215. Specifically, in one embodiment, the storage module 510 moves catalog information from a previous cache structure 215 to another cache structure 215 according to the assignment policy. In the event that the storage module 510 works with a catalog 245 that needs to be migrated to a new cache, the catalog 245 is disconnected and reconnected to the new cache structure 215 and all cached data may be moved by the storage module 510. By retaining cache data, performance may remain the same since records do not need to be re-cached. In one embodiment, the storage module 510 may trigger informational messages to the console to announce the move. These messages may specify what cache structure 215 the catalog 245 was moved from, what cache structure 215 it is being moved to, a reason for the move, and the like.

The storage module 510 may copy a volume record upon assignment/selection by the selection module 505. In another embodiment, the storage module 510 may copy a volume record according to a schedule. For example, a volume record for a particular catalog 245 may be scheduled to be moved from one cache structure 215 to another prior to catalog reorganization.

In one embodiment, the cache of the coupling facility 105 resides in a single LPAR. Therefore, the storage module 510 may move volume records from cache structure 215 to cache structure 215 in the same LPAR.

Figure 6:
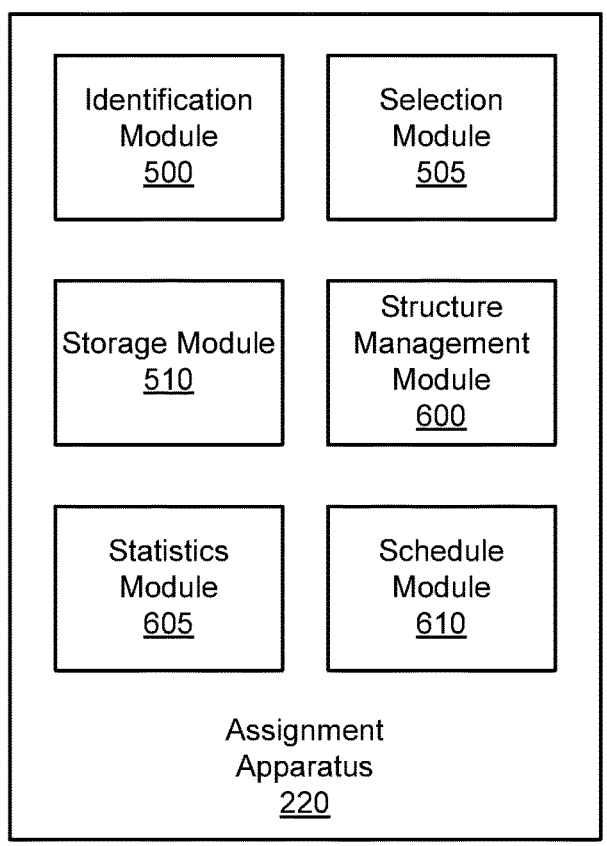
FIG. 6 is a schematic block diagram illustrating another embodiment of an assignment apparatus.

FIG. 6 is a schematic block diagram illustrating another embodiment of an assignment apparatus 220. The assignment apparatus 220 may be one embodiment of the assignment apparatus 220 of FIG. 2. The assignment apparatus 220 includes the identification module 500, the selection module 505, and the storage module 510, wherein these modules may be substantially similar to the like named modules described above in relation to FIG. 5. In addition, the assignment apparatus 220 includes a structure management module 600, a statistics module 605, and a schedule module 610.

The structure management module 600, in one embodiment, activates and deactivates ECS cache structures 215. Activating an ECS cache structure 215 may include creating an ECS cache structure. Likewise, deactivating an ECS cache structure 215 may include deleting an ECS cache structure. The structure management module 600 may one of activate and deactivate ECS cache structures 215 based on one or more of the assignment policy, a number of active catalogs 245, and a grouping of catalogs 245 assigned to ECS cache structures 215 in the coupling facility 105. For example, the assignment policy may specify a maximum amount of ECS cache structures 215 to be active at once, a minimum number of ECS cache structures 215 to be active, and the like.

The statistics module 605, in one embodiment, obtains the catalog usage statistics for a plurality of catalogs 245. In one embodiment, the statistics module 605 obtains catalog usage statistics from catalog usage data provided by the Catalog Address Space (CAS). For example, statistics for total searches for each catalog 245 may be obtained from the catalog modify command: MODIFY CATALOG, REPORT, CACHE. The statistics from CAS for a particular catalog 245 may be compared against thresholds in the assignment policy and if the statistics meet the threshold, the catalog 245 may be moved and/or initially assigned to a particular ECS cache structure. The statistics module 605 may estimate future catalog usage based on the catalog usage statistics and the selection module 505 may select cache structures 215 for catalogs 245 based on at least in part on the future catalog usage. For example, if future catalog usage is predicted to increase for a particular catalog 245, the selection module 505 may schedule the particular catalog 245 to be isolated or moved to a cache structure 215 with lesser-searched catalogs 245 prior to the predicted increase.

The schedule module 610, in one embodiment, references availability schedules. The schedule module 610 may reference an availability schedule of one or more of a particular host system 110 and a particular catalog 245. The availability schedule may include a maintenance schedule specifying when a particular catalog 245 of host system 110 will be undergoing maintenance.

Figure 7:
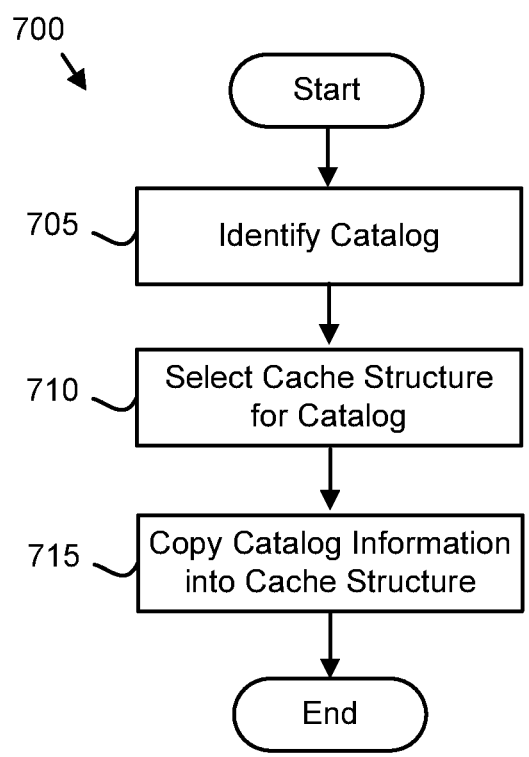
FIG. 7 is a schematic flow chart diagram illustrating one embodiment of a method for assigning shared catalogs to cache structures.

FIG. 7 is a schematic flow chart diagram illustrating one embodiment of a method 700 for assigning shared catalogs 245 to cache structures 215. The method 700 may be performed by a computer program product. The method 700 may perform at least a portion of the functions of the apparatus 220.

The method 700 starts and the identification module 700 identifies 705 a catalog 245 for sharing in association with a coupling facility 105. The coupling facility 105 includes a plurality of cache structures 215 for catalogs 245 of a cluster computing system 100. The coupling facility 105 is configured to facilitate data sharing among a plurality of host systems 110 of the cluster computing system. Next, the selection module 505 selects 710 a cache structure 215 of the plurality of cache structures 215 for the catalog 245 and/or assigns a cache structure 215 to the catalog 245 according to an assignment policy. The assignment policy is based on one or more usage status indicators. The storage module 510 stores 715 catalog information of the catalog 245 in the cache structure 215 and the method 700 ends.

Figure 8:
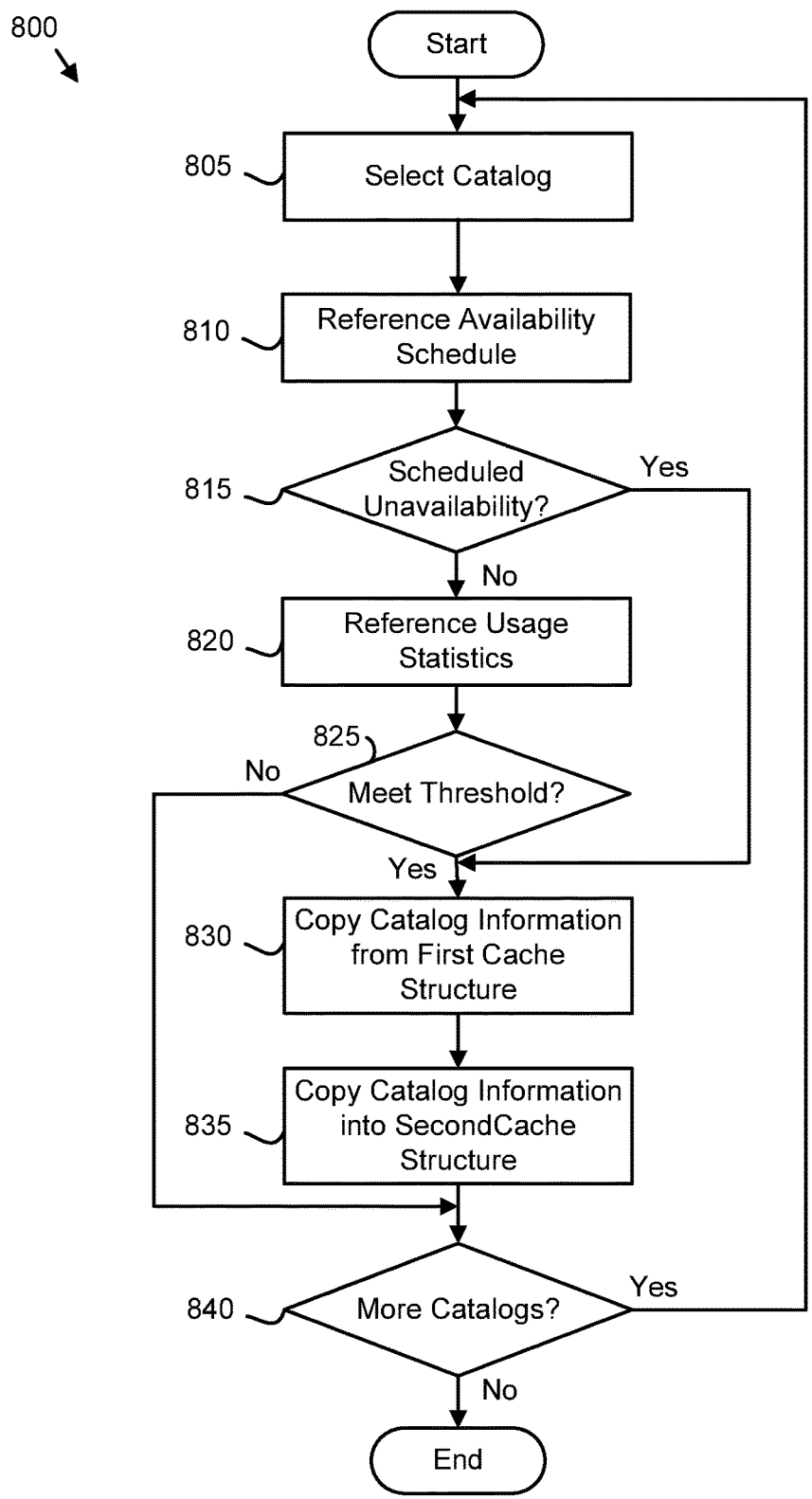
FIG. 8 is a schematic flow chart diagram illustrating another embodiment of method for assigning shared catalogs to cache structures.

FIG. 8 is a schematic flow chart diagram illustrating another embodiment of a method 800 for assigning shared catalogs 245 to cache structures 215. The method 800 may be performed by a computer program product. The method 800 may perform at least a portion of the functions of the apparatus 350.

The method 800 starts and the identification module 500 selects 805 a catalog 245 for assignment evaluation. The catalog 245 may be an active catalog 245 that is being accessed by one or more host systems 110 in the cluster computing system 100, has a volume record stored in the coupling facility 105, and the like. The schedule module 610 references 810 an availability schedule of one or more of a host system 110 specifically accessing the catalog 245, a host system 110 to which the catalog 245 is the master catalog, and the catalog 245 itself.

If the schedule module 610 determines 815 that one or more of these entities have scheduled unavailability, the storage module 510 copies 830 the volume record from a first ECS cache structure 215 (e.g. the ECS cache structure 215 in which the volume record resided upon initiation of the evaluation) to a second ECS cache structure 835. In one embodiment, the storage module 510 isolates the volume record from volume records of other catalogs 245 so that other catalogs 245 may not be affected when the catalog 245 or host system 110 becomes unavailable (e.g. when maintenance is performed). In one embodiment, the storage module 510 may copy the volume record substantially concurrently with the evaluation. In one embodiment, the storage module 510 may schedule the volume record to be copied prior to the time in which the host system 110 or catalog 245 will become unavailable and the storage module 510 then copies the volume record at that time.

If the identification module 500 identifies 840 more catalogs 245 to analyze, the method 800 returns to step 805. If the identification module 500 does not 840 identify more catalogs 245 to analyze, the method 800 ends.

Alternatively, returning to decision 815, if the schedule module 610 does not detect 815 scheduled unavailability, the statistics module 605 references 820 catalog usage statistics for one or more of the catalog 245 and one or more additional catalogs 245. If the statistics module 605 determines 815 that one or more of the catalog 245 and one or more additional catalogs 245 meet various usage thresholds according to the assignment policy, the storage module 510 copies 830 the volume record from a first ECS cache structure 215 (e.g. the ECS cache structure 215 in which the volume record resided upon initiation of the evaluation) to a second ECS cache structure 835. For example, if the catalog 245 meets a high usage threshold and one or more catalogs 245 in the second ECS cache structure 215 meet low usage thresholds, the storage module 510 may copy the volume record from the first ECS cache structure 215 to the second ECS cache structure. If the identification module 500 identifies 840 more catalogs 245 to analyze, the method 800 returns to step 805. If the identification module 500 does not identify 840 more catalogs 245 to analyze, the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a coupling facility comprising a plurality of cache structures for catalogs of a cluster computing system, the coupling facility facilitating data sharing among a plurality of host systems of the cluster computing system;
   a processor;
   a memory storing code executable by the processor to perform:
   identifying a catalog for sharing in association with the coupling facility;
   obtaining one or more usage status indicators for the catalog;

estimating future catalog usage based on the catalog usage statistics for the one or more usage status indicators;

selecting a cache structure of the plurality of cache structures for the catalog based on the one or more usage status indicators according to an assignment policy, wherein the usage status indicators comprise an availability schedule and wherein the processor further references an availability schedule of one or more of a particular host system and a particular catalog, wherein the processor selects the cache structure for the catalog based at least in part on the availability schedule; and storing catalog information of the catalog in an isolated, individual Enhanced Catalog Sharing (ECS) cache structure in response to the future catalog usage meeting a threshold, wherein only one volume record resides in the isolated, individual ECS cache structure.

2. The apparatus of claim 1, wherein the processor further moves the catalog information from a previous cache structure to the ECS cache structure according to the assignment policy.

3. The apparatus of claim 1, wherein the catalog information comprises update information for the catalog and the update information comprises an integrity Virtual Storage Access Method (VSAM) volume record (VVR) for the catalog.

4. The apparatus of claim 1, wherein the processor further performs one of activating and deactivating one or more cache structures based on one or more of the assignment policy, a number of active catalogs, and a grouping of catalogs assigned to cache structures in the coupling facility.

5. The apparatus of claim 1, wherein the processor further isolates the catalog in response to one of determining that the catalog is damaged, determining that a host system will be unavailable, and determining that the catalog will be unavailable.

6. A method for assigning a cache structure to a catalog, the method comprising:

facilitating data sharing among a plurality of host systems of a cluster computing system with a coupling facility comprising a plurality of cache structures for catalogs of the cluster computing system;

identifying, by use of a processor, a catalog for sharing in association with the coupling facility;

obtaining one or more usage status indicators for the catalog;

estimating future catalog usage based on the catalog usage statistics for the one or more usage status indicators;

selecting a cache structure of the plurality of cache structures for the catalog based on the one or more usage status indicators according to an assignment policy, wherein the usage status indicators comprise an availability schedule and wherein the method further referencing an availability schedule of one or more of a particular host system and a particular catalog, wherein the cache structure for the catalog based is selected at least in part on the availability schedule; and storing catalog information of the catalog in an isolated, individual Enhanced Catalog Sharing (ECS) cache structure in response to the future catalog usage meeting a threshold, wherein only one volume record resides in the isolated, individual ECS cache structure.

7. The method of claim 6, the method further comprising moving the catalog information from a previous cache structure to the ECS cache structure according to the assignment policy.

8. The method of claim 6, wherein the catalog information comprises update information for the catalog and the update information comprises an integrity Virtual Storage Access Method (VSAM) volume record (VVR) for the catalog.

9. The method of claim 6, the method further comprising performing one of activating and deactivating one or more cache structures based on one or more of the assignment policy, a number of active catalogs, and a grouping of catalogs assigned to cache structures in the coupling facility.

10. A computer program product for assigning a cache structure to a catalog, the computer program product comprising a computer readable storage medium storing machine readable code executed by a processor to perform the operations of:

facilitating data sharing among a plurality of host systems of a cluster computing system with a coupling facility comprising a plurality of cache structures for catalogs of the cluster computing system;

identifying a catalog for sharing in association with the coupling facility;

obtaining one or more usage status indicators for the catalog;

estimating future catalog usage based on the catalog usage statistics for the one or more usage status indicators;

selecting a cache structure of the plurality of cache structures for the catalog based on the one or more usage status indicators according to an assignment policy, wherein the usage status indicators comprise an availability schedule and wherein the processor further references an availability schedule of one or more of a particular host system and a particular catalog, wherein the processor selects the cache structure for the catalog based at least in part on the availability schedule; and storing catalog information of the catalog in an isolated, individual Enhanced Catalog Sharing (ECS) cache structure in response to the future catalog usage meeting a threshold, wherein only one volume record resides in the isolated, individual ECS cache structure.

11. The computer program product of claim 10, the operations further comprising moving the catalog information from a previous cache structure to the ECS cache structure according to the assignment policy.

12. The computer program product of claim 10, wherein the catalog information comprises update information for the catalog and the update information comprises an integrity Virtual Storage Access Method (VSAM) volume record (VVR) for the catalog.

13. The computer program product of claim 10, the operations further comprising performing one of activating and deactivating one or more cache structures based on one or more of the assignment policy, a number of active catalogs, and a grouping of catalogs assigned to cache structures in the coupling facility.

* * * * *